United States Patent [19]
Lia et al.

[11] Patent Number: 5,966,829
[45] Date of Patent: Oct. 19, 1999

[54] MECHANISM FOR MEASURING DEVICE

[75] Inventors: Raymond A. Lia; Robert Vivenzio, both of Auburn; Scott S. Stearns, Marietta; Dominick Danna, Syracuse; Timothy J. Smith, Auburn; Allan I. Krauter, Syracuse, all of N.Y.; Edward W. Wright, Fletcher, N.C.; Edward A. Johnson, Skaneateles, N.Y.

[73] Assignee: Welch Allyn, Inc., Skaneateles Falls, N.Y.

[21] Appl. No.: 08/972,583

[22] Filed: Nov. 18, 1997

[51] Int. Cl.$^6$ ................................ G01B 3/22; G01L 7/08
[52] U.S. Cl. ................................ 33/556; 33/832; 73/729.1
[58] Field of Search .................... 73/700, 715, 729.1; 33/556, 792, 832, 836

[56] References Cited

U.S. PATENT DOCUMENTS

| | | | |
|---|---|---|---|
| 1,106,341 | 8/1914 | Bristol | 73/729.1 |
| 1,328,876 | 1/1920 | Hill | 73/729.1 |
| 1,377,032 | 5/1921 | Starling et al. | 73/387 |
| 2,087,494 | 7/1937 | Annin | 73/729.1 |
| 2,165,017 | 7/1939 | Sisson | 33/556 |
| 2,564,669 | 8/1951 | Brady | 73/729.1 |
| 2,580,999 | 1/1952 | Conrad | 73/715 |
| 2,636,394 | 4/1953 | Melchior | 73/386 |
| 2,642,670 | 6/1953 | Dow | 33/832 |
| 3,805,618 | 4/1974 | Csaposs et al. | 73/729.2 |
| 3,874,242 | 4/1975 | Csaposs et al. | 73/729.2 |
| 4,036,061 | 7/1977 | Speidel | 73/729.2 |
| 4,040,298 | 8/1977 | Lee et al. | 73/715 |
| 4,255,970 | 3/1981 | Van Pottelberg | 73/729.1 |
| 4,501,142 | 2/1985 | Huang | 73/715 |
| 4,685,336 | 8/1987 | Lee | 73/715 |
| 4,875,294 | 10/1989 | Jefferson | 33/792 |
| 5,181,422 | 1/1993 | Leonard et al. | 73/715 |
| 5,753,821 | 5/1998 | Chou | 73/715 |

*Primary Examiner*—G. Bradley Bennett
*Attorney, Agent, or Firm*—Wall Marjama Bilinski & Burr

[57] ABSTRACT

A gage mechanism for a blood pressure measuring device or other similar apparatus includes a supported shaft member having one end in contact with an inflatable bellows. A pointer is attached at an opposite end of the shaft and a helically wound spring is attached to the shaft and a supporting structure. As the bellows inflates, the shaft is axially displaced and causes rotation due to the constraint of the helical ribbon spring, causing a corresponding angular deflection of the attached pointer relative to an indicating scale. The mechanism includes a first adjustment member for allowing the pointer to be preset to a zero or calibrated position, and a second adjustment mechanism that controls the amount of angular rotation of the shaft and pointer for a displacement of the bellows.

37 Claims, 6 Drawing Sheets

MECHANISM FOR MEASURING DEVICE

FIELD OF THE INVENTION

This invention relates to the field of measuring instruments, and in particular to a mechanism used in connection with a measuring instrument which is effectively responsive and which further allows simple and convenient adjustment.

BACKGROUND OF THE INVENTION

Certain measuring devices are known, such as those found in sphygmomanometers (blood pressure cuffs) which include a pneumatic bulb which inflates a pressure chamber of an attached sleeve that is fitted over the arm or leg of a patient. A bellows assembly, responsive to changes in fluid pressure of the pneumatic bulb and the sleeve pressure chamber is positioned in a dial indicator housing. The pointer of the dial indicator is interconnected to the bellows assembly by a gage mechanism whereby inflation of the bellows causes a corresponding circumferential movement of the pointer.

Typically, these mechanisms are quite complex and intricate, and are akin in terms of their manufacture and precision to Swiss watches. For example, in one such mechanism, a pair of diaphragm springs are attached adjacent opposing ends of a spindle. A bottom end of the spindle is placed in contact with the inflatable bellows assembly and a twisted bronze band perpendicularly disposed at the top end of the spindle is connected thereto in parallel by a horizontally disposed bent spring part. As the spindle axially deflects due to the inflation of the bellows assembly, the bent spring part is caused to deflect causing the band to twist. The pointer which is attached to the bronze band is thereby caused to rotate relative to an adjacent dial indicating face.

These known mechanisms include a plurality of moving components, each having multiple bearing surfaces. Therefore, such assemblies must be manufactured with a considerable degree of tolerancing to minimize errors, thereby creating a similar level of expense in their manufacture.

In addition, any adjustments required after assembly of such mechanisms, such as to null out the pointer needle or adjust the sensitivity of the device, require substantial teardown or at least significant and undesired disassembly of the measuring device.

SUMMARY OF THE INVENTION

A primary object of the present invention is to improve the state of the art of measuring devices.

A further object of the present invention is to provide a movement mechanism for a measuring device which is simpler and more inexpensive to manufacture, but which is as reliable as known mechanisms.

Yet another object of the present invention is to provide a measuring device which is easy to adjust and which does not require teardown of the instrument if and when calibration is required.

Therefore, and according to a preferred aspect of the present invention, there is provided a movement mechanism comprising:

a shaft member having opposing first and second ends and an axis defined between said first and second ends;

axial displacement means for moving said first end of said shaft member in an axial direction; and at least one spring member coaxially positioned relative to said shaft member axis, said spring member being attached at one end to an intermediate portion of said shaft member and attached at an opposite end to a support, wherein said displacement means causes said shaft member to translate in said axial direction, said spring member to flex, and said shaft member to rotate.

Preferably, the attachment of the spring member allows the spring to pivot or hinge during the stroke of the shaft to minimize hysteresis or other nonlinear effects.

The movement mechanism according to a preferred embodiment includes rotational position adjustment means for adjusting the circumferential location of the pointer and displacement adjustment means for preloading the spring member to thereby control the responsive amount of rotation induced over a specific axial movement of the shaft member.

Most preferably, the rotational position adjustment means includes a rotatable element coaxially aligned with the shaft, allowing an the shaft member to selectively preset or realign the pointer position. The displacement adjustment means includes a coaxial sleeve which selectively preloads the spring member, in which preloading the spring allows adjustment of the amount of angular deflection or sweep of the pointer in response to a predetermined amount of axial displacement of the shaft.

According to another preferred aspect of the present invention, there is provided a mechanism for use in a measurement device, said device comprising a housing, displacement means disposed within said housing, and indicating means responsive to said displacement means for indicating a change in a parametric value based on movement of said displacement means, said mechanism including:

a shaft member disposed in said housing between said indicating means and said displacement means, said shaft member having opposing first and second ends defining an axis therebetween; and at least one spring member coaxially positioned relative to said shaft member axis, said spring member having a first end attached to said shaft member and a second end attached to a support, wherein said displacement means causes said shaft member to translate along said shaft axis, said spring member to flex, and said shaft member to rotate.

According to yet another preferred aspect of the present invention, there is provided a mechanism for a blood pressure gage, said gage including a bellows assembly containing a movable element disposed on one side of a housing interior, and a dial indicator face on an opposite side of said housing interior, said mechanism comprising:

a shaft member having a first end in contact with said bellows assembly and an opposite second end having a pointer attached thereto adjacent to indicia on said dial indicator face, said first and second ends defining an axis;

a spring member coaxially positioned along the axis defined by said shaft member ends, said spring member having a first end attached to an intermediate portion of said shaft member and a second end attached to a support, wherein movement of said movable element of said bellows assembly causes said shaft member to translate in an axial direction, said spring member to flex, and shaft member to rotate to allow said pointer to move circumferentially relative to said dial face.

According to another preferred aspect of the present invention, there is provided a method for calibrating a measuring device, said measuring device including displacement means disposed on one side of a housing interior, a dial indicator face disposed on an opposite side of said housing interior, and a movement mechanism disposed therebetween, said movement mechanism comprising an axially movable shaft member supported in said housing interior, said shaft member having a first end disposed adjacent said displacement means and a second end including a pointer adjacent said dial indicating face, a spring member attached at one end to said shaft member and at an opposite end to a support, said method including the steps of:

presetting the distance between said spring ends as attached to said axially movable shaft and said support to a predetermined length so as to affect the amount of rotation of said pointer for a given movement of said displacement means; and     rotating said shaft and said support to align said pointer to a null position relative to said dial indicator face.

An advantage of the present invention is that the described mechanism utilizes a minimum number of bearing surfaces and fewer moving parts than previously known systems. Furthermore, the described mechanism is simpler and more inexpensive to manufacture, yet is as reliable as other known systems.

A further advantage is that the entire mechanism can be fitted in a minimum of space and that any calibration adjustments can be made without requiring an entire teardown of the mechanism.

Yet another advantage of the present invention is that each of the elements of the described system are coaxially mounted to the shaft, making the system compact and reliable.

These and other objects, features and advantages will be described in greater detail in the following Detailed Description of the Invention which should be read in conjunction with the accompanying drawings.

DETAILED DESCRIPTION OF THE INVENTION

Throughout the course of discussion which follows, a number of terms are used to provide a frame of reference with respect to the accompanying drawings. These terms, which include "top", "bottom", "upper", "lower", "lateral", etc, are intended as a frame of reference only and are not intended to be limiting of the present invention.

In addition, each of the following described embodiments are shown in conjunction with a blood pressure measuring device having a known design. From the following discussion, however, it should be readily apparent to one of ordinary skill in the field that the mechanism of the present invention can be easily substituted into other blood pressure measuring devices, and can also be modified to be suitably useful in other forms of measurement devices, such as for measuring distance, fluid pressure, forces, and the like.

Figure 1:
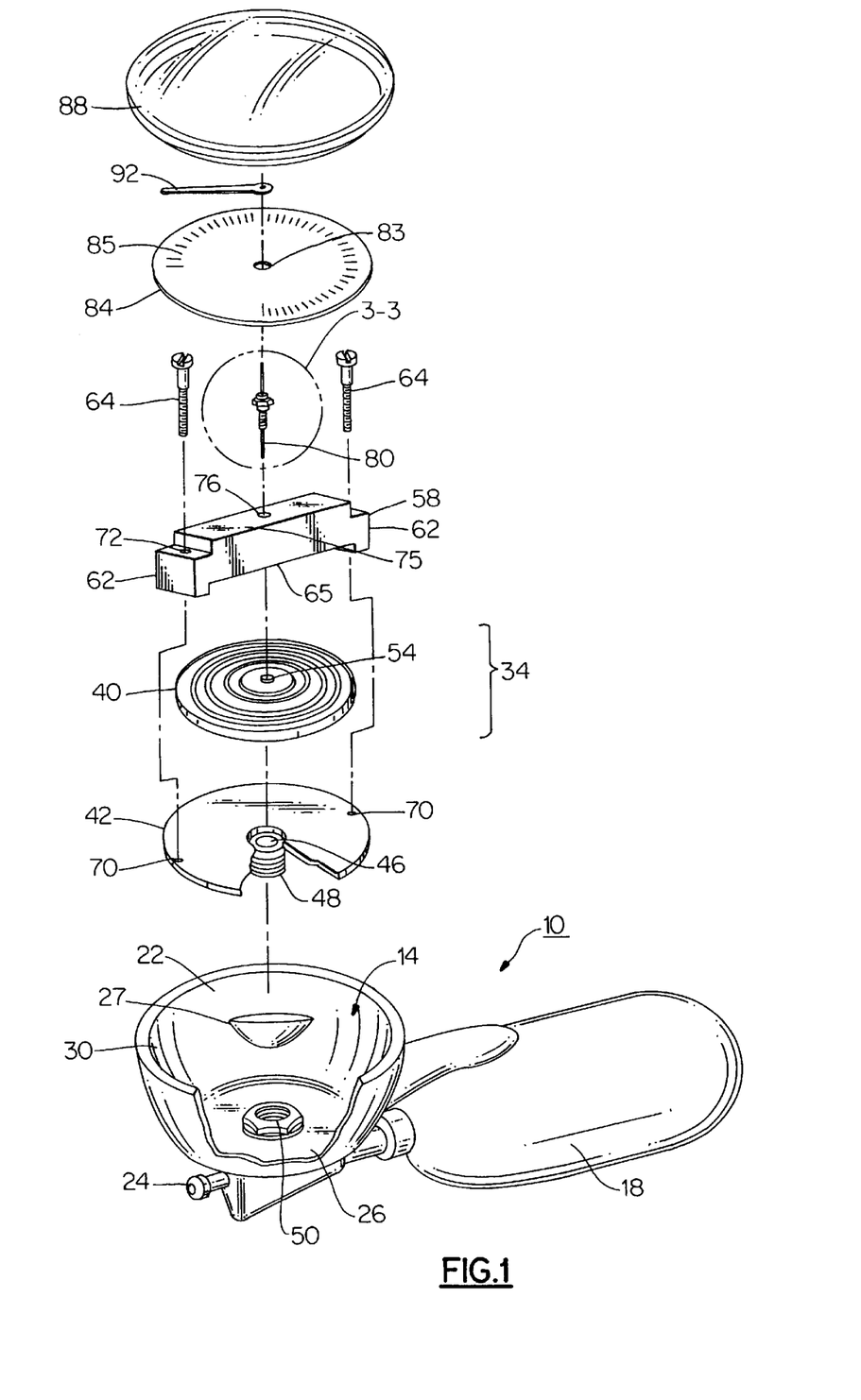
FIG. 1 is an exploded view of a blood pressure measuring device (partially shown) utilizing a mechanism in accordance with a first preferred embodiment of the present invention.

Therefore, and referring to the FIGS., the present invention is described for use with a blood pressure measuring device, which is partially shown in FIG. 1. The measuring device includes an inflatable sleeve or cuff(not shown) made from a vinyl-coated polyethylene or other suitable material, the sleeve typically including corresponding loop and hook fastener portions on the exterior thereof for variable adjustment of the sleeve onto the arm or leg of a patient. The sleeve is attached through a hose (not shown) and a conduit 24 provided on a housing 10 which is interconnected to an attached pneumatic bulb 18 for providing fluid communication with an inflatable pressure chamber provided in the sleeve in a manner which is well known. That is, the pneumatic bulb 18, when squeezed, provides a source of pressurized fluid (air) for inflating the sleeve's pressure chamber (not shown). The above details such measuring devices are widely known, such as those manufactured by Tycos, Inc., a subsidiary of Welch Allyn, Inc., among others and require no further discussion herein except where applicable to the present invention.

Still referring to FIG. 1, the housing 10 is a compact enclosure having a substantially cylindrical shape including a hollow interior 14 defined by a circumferential inner wall 22, a bottom wall 26, and an open top end 30. The interior 14 is sized for retaining a plurality of components as herein described, including a bellows assembly 34 comprising a thin cylindrical body 40 made from a flexible material and having a contained inflatable bladder component 38, FIG. 8, which is mounted to one side of a flat circular support plate 42. The support plate 42 includes a center opening 46 which allows fluid communication between the inflatable bladder component 38, the sleeve (not shown) and the pneumatic bulb 18 through attachment of a threaded portion 48 with the internal threads of a port 50 provided on the bottom wall 26 of the housing 10.

A small circular bearing surface 54 is preferably provided at the top of the flexible body 40. Preferably, the top bearing surface 54 is centrally located and made from a hard jeweled material which prevents the distal end 100, FIG. 2, of a vertically extending shaft member 96, FIG. 2, from directly impinging on the bellows assembly 34. According to the preferred embodiment, the surface 54 is made from sapphire, though other suitably hard materials may be used to prevent puncture or damage of the bellows assembly 34,and to minimize rotational friction between the shaft member 96, FIG. 2, and the bellows assembly 34.

A bridge member 58 adjacently disposed in the housing interior 14 supports the bellows assembly 34 in the housing 10. The bridge member 58 is fabricated from a substantially rectangularly shaped and thickened section of aluminum or other suitable material having a pair of opposing lateral ends 62, each end having a through opening 72 aligned with similar openings 70 provided at the outer periphery of the circular support plate 42 for allowing engagement of a screws 64 or other threaded fasteners. The screws 64 are preferably attached from the top side of the bridge member 58 and are secured into the openings 70 of the support plate 42, or alternately to the housing interior 14.

Figures 3, 3A:
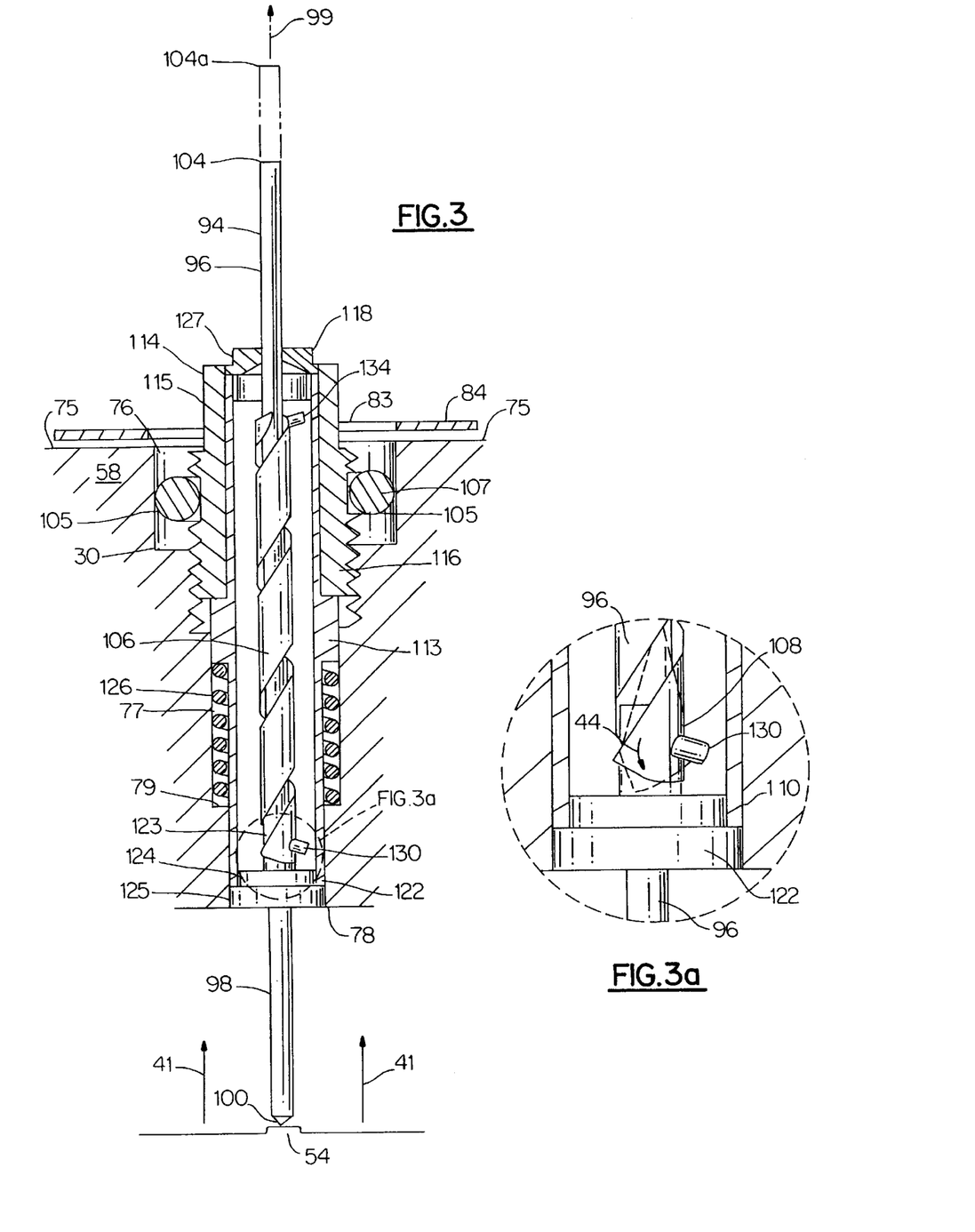
FIG. 3 is the perspective view of the mechanism of FIG. 2, partially in section, as assembled in the measuring device.
FIG. 3(a) is an elevational view of one end of a helical spring member used in the mechanism of FIGS. 2 and 3, illustrating a preferred means of attachment to allow hinging thereof.
Figure 4:
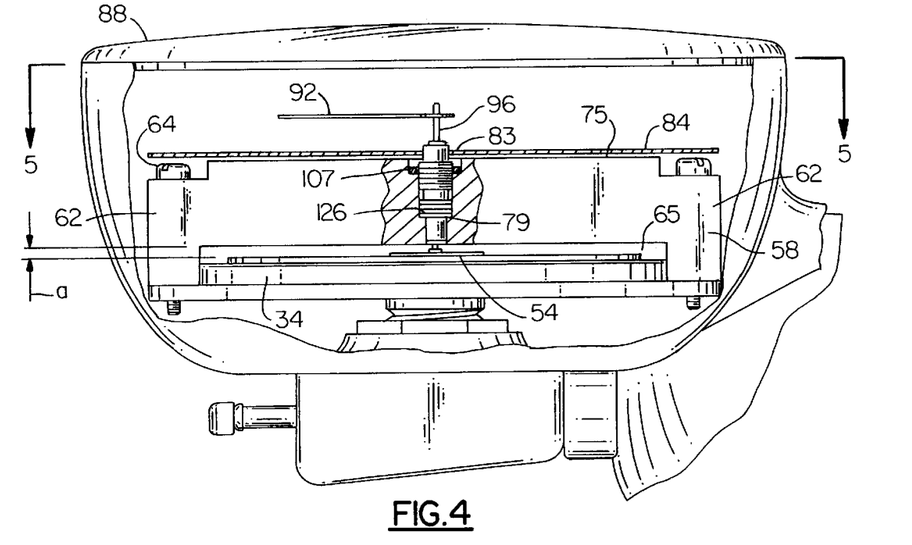
FIG. 4 is an elevational view of the mechanism of FIGS. 1–3 showing the operation of the mechanism in response to inflation of a bellows assembly.
Figure 5:
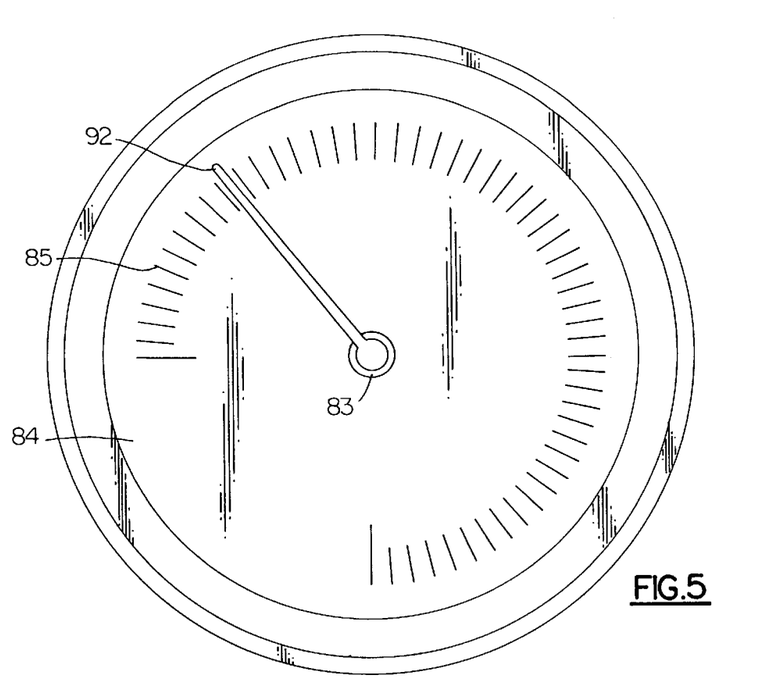
FIG. 5 is a top view of the dial indicator face of the measuring device of FIG. 4.
Figure 6:
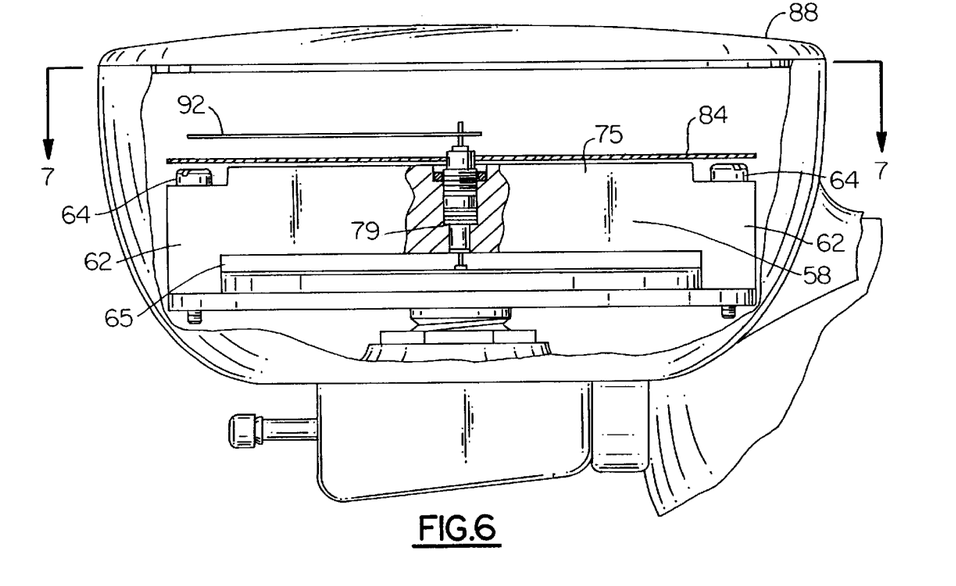
FIG. 6 is the elevational view of FIG. 4 showing the mechanism prior to inflation of the bellows assembly.

The bellows assembly 34 is sandwiched between the top surface of the support plate 42 and the bottom of the bridge member 58, the assembly being maintained in a recess 65 between the lateral ends 62, as most clearly shown in FIGS. 4 and 6. In addition, each of the lateral ends 62 are also recessed at the top of the bridge member 58 such that the heads of the screws 64 do not extend above a top surface 75. A central through opening 76 is coaxially aligned with the top bearing surface 54 of the sandwiched bellows assembly 34 upon assembly. Turning briefly to FIG. 3, the opening 76 includes machined upper and lower portions 77, 78 for accommodating the mechanism 80 of the present embodiment, as described in greater detail below.

Referring to FIGS. 1, 2, 4 and 5, a dial face 84 having a readable indicating portion 85 is supported within the housing 10 at a predetermined distance above the top surface 75 of the assembled bridge member 58 by spaced and circumferentially disposed ridges 27 (only one being shown in FIG. 1) and a glass or clear plastic cover or window 88 is attached by known means to the open top end 30 of the housing 10. A pointer element 92 is integrally crimped or otherwise attached to the top or proximal end 104 of a vertically disposed shaft member 96, extending through the central opening 76 of the bridge member 58 and a dial face opening 83. The pointer element 92 is aligned with the readable indicating portion 85 of the dial face 84 as viewed through the clear window 88. The alignment of the pointer element 92 is more completely described in a later portion of this description.

Figure 2:
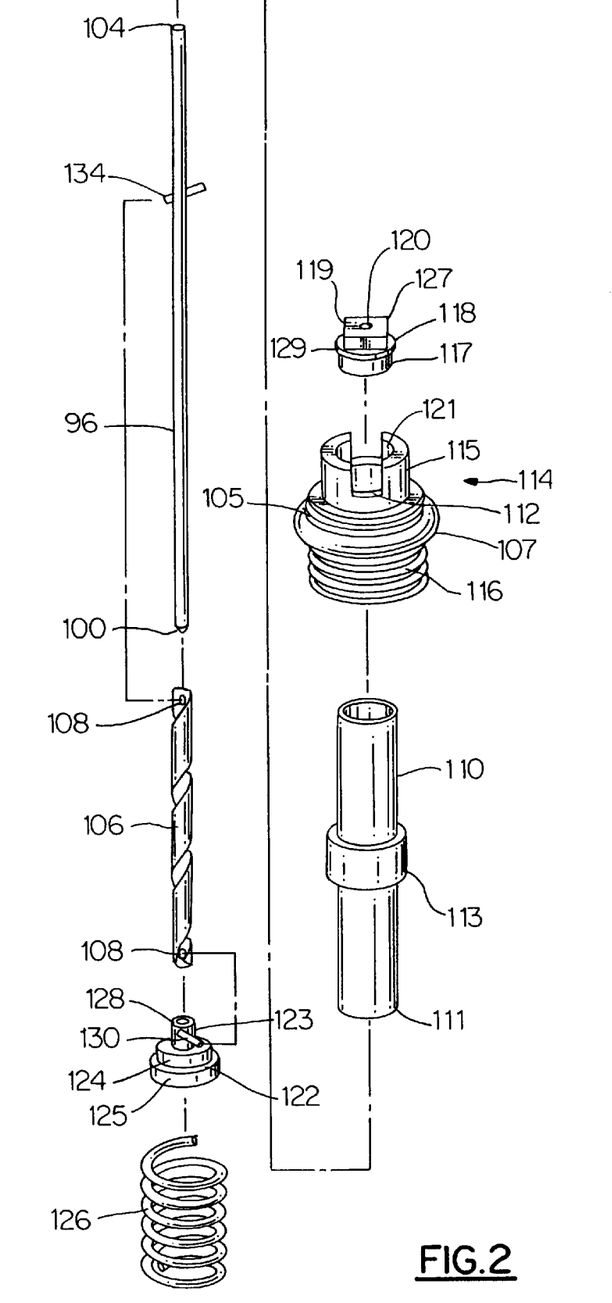
FIG. 2 is an enlarged, exploded perspective view of the mechanism of FIG. 1.

Turning to FIGS. 2 and 3, the mechanism 80 according to the present embodiment includes the above referenced shaft member 96, which is an elongate cylindrical body having a distal end 100 and an opposite proximal end 104. According to the present embodiment, the shaft member 96 is made from a hardened 304 stainless steel, though other similar materials may be easily substituted.

A spring member 106 positioned over a portion of the cylindrical shaft member 96 is attached at respective upper and lower ends to the shaft member and a bottom cap member 122. According to this embodiment, the spring member 106 is fabricated from a thin ribbon of beryllium copper which is helically wound into a cylindrical form, such that it possesses this cylindrical form in its free state. Though the above material is particularly useful, it will be readily apparent that other suitable materials similarly formed can be substituted. The spring material is relatively thin, according to this embodiment, and has a suitable width dimension to avoid twisting and potential frictional interference with the shaft member 96 when operated, the operational features being more completely described below.

In terms of specifics, the spring member 106 herein described has a thickness of approximately 0.0005 inches (0.013 mm) in thickness, and is wound into about three helical coils. For the application described, thicknesses in the range of 0.0003–0.0007 inches (0.008–0.018 mm) are acceptable. The thickness and size parameters, of course, will vary with the size of the measuring device and the magnitude of the displacement, among other factors.

A pair of cylindrical pins 134, 130 are provided for engaging attachment holes 108 at respective upper and lower ends of the spring member 106. Each pin 130, 134 is welded or otherwise attached to the exterior of the shaft member 96 and the bottom cap member 122, respectively. According to this embodiment, the pins 130, 134 are fabricated from 304 stainless steel wire and are welded to the exterior of the above components. Preferably, for reasons better articulated below, the attachment holes 108 are oversized in comparison with the diameters of the cylindrical pins 130, 134.

A hollow cylindrical sleeve 110 introduced over the coaxially arranged shaft member 96 and attached spring member 106 includes a bottom end 111 which, during assembly, fits over concentric top and intermediate portions 123, 124 of the bottom cap member 122, the end abutting a similar shoulder portion 125. The intermediate portion 124 has a diameter which allows the bottom cap member 122 to be press fitted into the bottom end 111 of the sleeve 110. An opening 128 passing through each of the concentric portions 123, 124, and 125 of the bottom cap member 122 is sized to accommodate an extending lower portion 98 of the cylindrical shaft member 96.

The sleeve 110 is predominantly a thin-walled tubular section having an external collar or ring portion 113 disposed along a portion of its major longitudinal dimension.

A spring screw 114 having a through opening 121 essentially matching the diameter of the tubular sleeve 110 is fitted over the top thereof, the screw having an externally threaded lower portion 116 and a circular upper portion 115. The threaded lower portion 116 further includes an engagement portion 105 for receiving an O-ring 107 mounted therein. When finally assembled, the bottom of the externally threaded lower portion 116 abuts against a circumferential top edge of the external ring portion 113 of the sleeve 110, and the upper portion 115 extends slightly above the top end thereof. The upper portion 115 also includes a pair of circumferential slots 112, diametrically opposed to one another, which are machined or otherwise cut into the top of the spring screw 114. According to this embodiment, the spring screw 114 and the tubular sleeve 110 are each fabricated from 302 stainless steel.

A cylindrical top cap member 118 (also referred to hereinafter as a zero adjustment member) includes an engagement portion 117 which can be press fitted into the top end of the hollow tubular sleeve 110. An upper portion 127 of the adjustment member 118 includes a depending circular shoulder 129 which abuts the top edge of the sleeve 110 and pairs of oppositely disposed parallel flats 119 which allow engagement by a tool (not shown). The zero adjustment member 118 also includes a through opening 120 sized to accommodate an upper extending section 94 of the cylindrical shaft member 96, the opening preferably being tapered such that the shaft member is contacted only over a short portion adjacent the top of the upper section 127 only. According to an alternate embodiment, (not shown) the zero adjustment member 118 can be also be integrally constructed with the top of the tubular sleeve 110.

A biasing spring 126 is also fitted over the tubular sleeve 110 oppositely from the spring screw 114 relative to the ring portion 113. Referring to FIGS. 3 and 4, one end of the spring 126 is placed in contact with a bottom circumferential edge of the ring section 113, with the remaining end being in contact with a similarly sized shoulder 79 provided in the center opening 76 of the bridge member 58. The shoulder 79 separates the upper portion 77 of the central opening 76 from the lower portion 78, the upper portion further including a set of internal threads matching those of the threaded lower portion 116 of the spring screw 114.

As is clear from the enlarged sectional view of the assembled mechanism 80 illustrated in FIG. 3, the zero adjustment cap 118, the bottom cap member 122, and the tubular sleeve 110 form an enclosure containing the portion of the cylindrical shaft member 96 having the coaxially attached spring member 106. The formed enclosure is contained within the central opening 76 of the bridge member 58 with the zero adjustment member 118 and part of the upper portion 115 of the spring screw 114 extending from the top surface 75 of the bridge member 58 and extending through the opening 83 of the dial face 84.

Preferably, the above openings 120, 128 in the zero adjustment member 118 and the bottom cap member 122, respectively, do not prevent the shaft member 96 from translating along a vertical direction, or axis, shown as reference numeral 99, FIG. 3.

Referring to FIGS. 3 and 4, when assembled, the shaft member 96 has a length dimension such that the distal end 100 is in substantial contact with the top bearing surface 54 of the bellows assembly 34. The shaft member 96 extends through the coaxial openings 128, 120 provided in the bottom cap member 122 and the zero adjustment member 118. The extending upper portion 94 of the shaft member 96 further extends through the opening 83 provided in the dial face 84 with the pointer element 92, as noted previously, being integrally or securely attached to the proximal end 104 thereof. Preferably, the opening 83 in the dial face 84 is sufficiently large to allow tools (not shown) for adjustment of the mechanism 80, as is now described.

In use, the zero adjustment member 118, the tubular sleeve 110 and the bottom cap member 122 provide a first position adjustment means for calibrating the described mechanism 80 and for allowing the pointer element 92 to be aligned with a zero or null position on the indicating portion 85 of the dial face 84.

Figure 7:
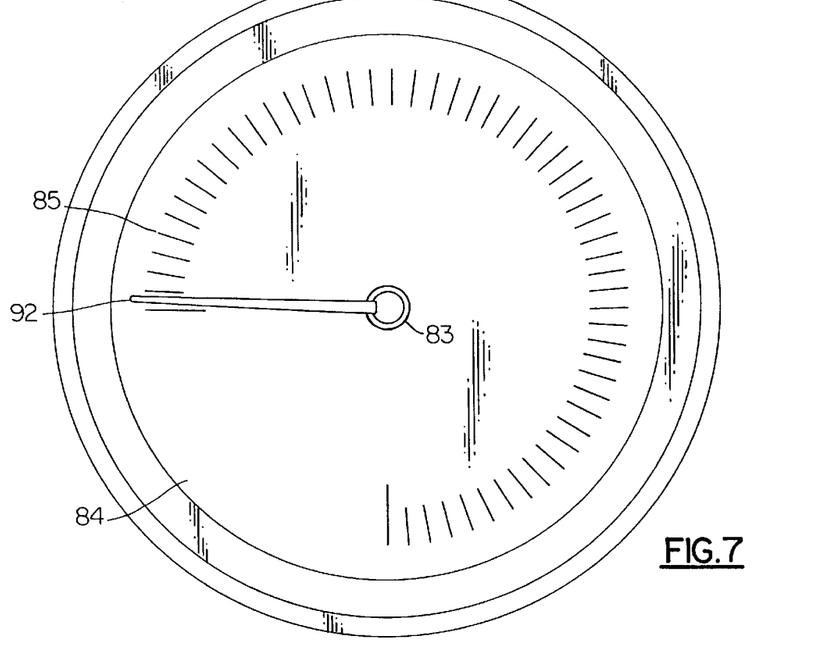
FIG. 7 is a top view of the dial indicator face of the measuring device of FIG. 6.

The zero adjustment member 118, whether integral or separately attached to the tubular sleeve 110, allows the entirety of the shaft member 96 to be rotated about the vertical shaft axis 99 by engagement of a tool with either pair of flats 119. The shaft member 96, being supported through the openings 120, 128 provided in the zero adjustment member 118 and the bottom cap member 122, is caused to rotate along with the tubular sleeve 110 and the bottom cap member 122. Consequently, both the shaft member 96 and the spring member 106 are caused to rotate along with the attached pointer element 92, allowing the pointer to be initially set, FIG. 7, relative to a null position on the dial face 84.

The present mechanism 80 also includes a second calibrating mechanism which provides for adjustment of the degree of rotation of the shaft member 96 in response to a displacement supplied by the bellows assembly 34. The premise of this calibration is based on controlling the amount of preload placed on the helically wound spring member 106. Turning to FIGS. 2–7, the externally threaded lower portion 116 of the spring screw 114 cooperates with the internal threads shown in FIG. 3, provided in the center opening 76 of the bridge member 58. The slots 112 provided in the adjacent upper section 115 of the spring screw 114 allow engagement with a suitable tool (not shown).

As shown in FIG. 3, a portion of the upper portion 127 of the engaged top cap member 118 and the upper portion 115 of the spring screw 114 extends slightly above the top surface 75 of the bridge member 58 and the dial face 84 to allow engagement without requiring extensive disassembly of the housing 10. Preferably, the dial face opening 83 is sufficiently large to allow access of the tool (not shown) directly to the slotted portion 112 of the spring screw 114 and/or the flat faces 119 of the zero adjustment member 118. By turning the spring screw 114 in a locking (clockwise) direction, the lower end thereof compresses the ring portion 113 of the sleeve 110, causing the entirety of the sleeve to deflect downwardly and to compress the biasing spring 126 against the shoulder 79 within the central opening 76 of the bridge member 58. The downward deflection of the sleeve 110 causes the lower end of the spring member 106, attached to the bottom cap member 122 also to deflect downwardly, thereby preloading the spring member and subsequently increasing the amount of rotational movement of the shaft member, and the pointer member 92 for a predetermined displacement from the bellows assembly 34. The spring member 106 originally has a predetermined axial length which can be varied based on a corresponding rotation of the spring screw 114. Expanding this axial length of the spring member 106 by moving the spring screw 114 downwards tends to increase the amount of rotation for a given axial displacement of the shaft member 96 while moving the spring screw 114 upwards shortens the predetermined axial length and decreases the amount of circumferential movement of the shaft member, and also of the pointer element 92 relative to the dial face 84. The O-ring 107 assists in providing a frictional load such that vibrations do not cause rotation of spring screw 114, such rotation undesirably altering a set axial location of said spring screw.

Figure 8:
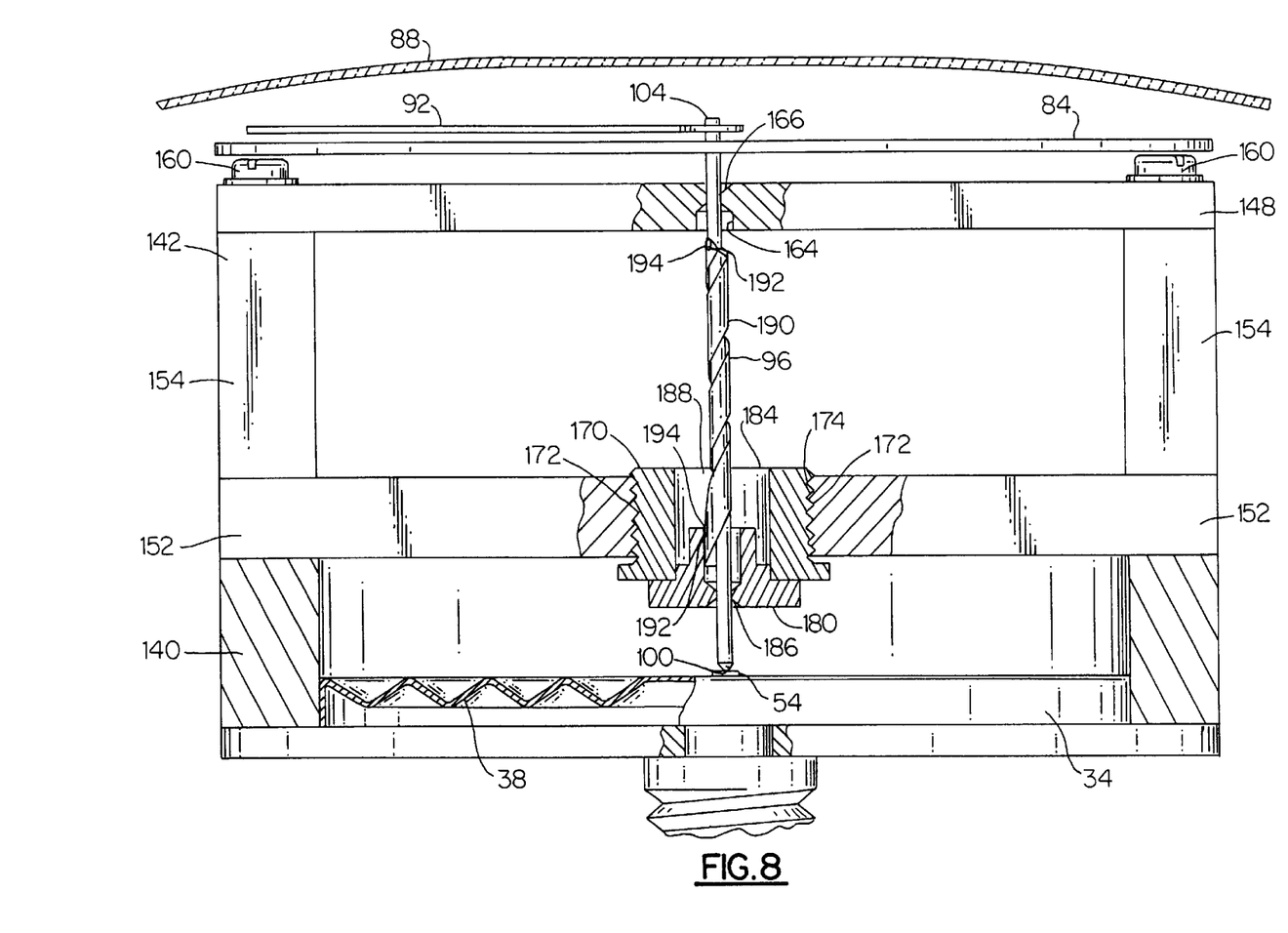
FIG. 8 is an elevational view, partially in section, of a movement mechanism made in accordance with a second embodiment of the present invention.

In operation, the bladder component 38, FIG. 8, is caused to inflate the direction shown as 41 in FIG. 3 in response to pressure changes in the sleeve,(not shown) in a manner commonly known as induced by the pneumatic bulb 18 and patient to which the sleeve (not shown) is attached. The inflation of the bellows assembly 34 causes a vertical displacement of the flexible body 40, FIG. 1, and the top bearing surface 54 impinging on the distal end 100 of the shaft member 96. The shaft member 96, therefore, is urged to translate in the vertical direction 99, as shown in phantom by proximal end 104(a). Due to the constraint supplied by the attachment of the lower end of the spring member 106 to the bottom cap member 122, however, the shaft member 96 is caused to rotate as well as to translate due to the vertical displacement of the inflated bellows in a clockwise direction (as viewed down the axis 99) as the spring member unwinds. The rotation of the shaft member 96 thereby causes the pointer element 92 attached to the proximal end 104 thereof to sweep in a circumferential direction relative to the indicating portion 85 of the dial face 84.

Most preferably, and referring to FIG. 3(a), the attachment of the cylindrical pin 130,with the end hole 108 at one end of the spring member 96, causes the ends of the spring member 96 to pivot or hinge during the motion of the shaft member 96 in the direction indicated by reference numeral 44. The remaining end (not shown) of the spring member 106 is similarly affected. This pivoting minimizes any hysterisis and assures greater linearity.

As noted above, the amount of sweep or circumferential movement of the pointer element 92 can be readily controlled by adjusting the amount of preload of the spring member 106. A resulting change in the amount of preload invariably produces a deviation in the pointer element 92 relative to the dial face 84 which can easily be calibrated against a known pressure load to determine the proper amount of preload. Therefore, a zero calibration should also follow by engaging the flats 119 of the zero adjustment member 118 by a suitable rotation thereof.

In passing, it should be noted that the spring member 106 is also preferably fabricated such that its inner diameter is greater than the diameter of the shaft member 96, even when the spring member has been unwound in the manner described below to prevent frictional interference which could impact repeatability and linearity of the mechanism.

A second embodiment of a movement mechanism according to the present invention is now described with reference to FIG. 8. For the sake of clarity, similar parts are herein labeled with the same reference numerals.

A similar elongate cylindrical shaft member 96 is vertically situated within a housing 140 (only partially shown). A support member 142 includes an upper support portion 148 and a lower support portion 152 spaced by a predetermined distance as defined by cross pieces 154, the supports being interconnected by fasteners 160 inserted through holes (not shown) in a conventional manner. The upper support portion 148 includes a center opening 164 sized to allow the passage of the vertically disposed shaft member 96, the opening also preferably including a circularly tapered bearing surface 166 for impinging point contact thereon.

The lower support portion 152 includes a coaxial, though larger circular opening 174 which accommodates a pair of coaxial adjustment members. A sweep adjustment screw 170 having a cylindrical configuration is sized to fit within the confines of the opening 174, which is preferably threaded to allow engagement by a corresponding set of external threads 172 provided on the exterior of the adjustment member.

A zero adjustment member 180 fits within a center opening 184 of the sweep adjustment screw 170, the zero adjustment member also having a coaxial center opening 188 to allow the passage therethrough of the shaft member 96. The opening 188, like that of the upper support portion 148 also includes a tapered bearing surface 186.

The cylindrical shaft member 96 includes a pair of ends 100, 104. A pointer element 92 is attached or integrally formed at the proximal end 104 and the opposite distal end 100 is positioned in proximity to a bellows assembly 34. Each of the support portions 148, 152 are designed to allow axial movement of the shaft member 96 therethrough.

A thin ribbon-like spring member 190 is helically wound about a substantial portion of the cylindrical shaft member 96 between the upper and lower support portions 148, 152, the spring member being fixedly attached to the shaft member adjacent the upper support portion and to the zero adjustment member 180 adjacent the lower support portion. As in the preceding embodiment, the spring member 190 is fabricated from a thin ribbon of a suitable material, such as beryllium copper. The spring member 190 can be attached by welds 194 at either end 192 to the shaft member 96 and to the interior of the zero adjustment member 180, respectively. Alternately, the ends of the spring member 190 can be attached in a manner similar to that described in the preceding embodiment to allow the spring member to hinge or pivot during the axial displacement of the shaft member 96.

The zero adjustment member 180 is sized to retain the shaft member 96 in the opening of the sweep adjustment screw 170 with the circular bottom bearing surface 186 providing point contact against the exterior thereof. The upper support portion 148 includes a similar bearing surface 166 located on the interior of the opening 164 which guides and supports the shaft member 96 to displace along a predominantly axial path as indicated along the vertical direction 99, FIG. 3.

Operation of the described movement mechanism is as follows. When air pressure is applied to the inside of the inflatable bladder component 38, the top bearing surface 54 bears against the distal end 100 of the shaft member 96, causing the shaft to translate. Since the lower end of the spring member 190 is fixed to the stationary zero adjustment member 180, the spring member is forced to stretch (unwind) in an axial direction. In doing so, the shaft member 96 is also caused to rotate in a clockwise direction, according to this embodiment, and the attached pointer element 92 is circumferentially displaced relative to the indicating portion 85 of the dial face 84.

Adjustment of the zero adjustment member 180 is accomplished by rotation relative to the sweep adjustment screw 170. The turning of the zero adjustment member 180 also turns the shaft member 96, allowing the zero circumferential position of the pointer element 92 to be set relative to the indicating portion of the dial face 84.

Rotation of the sweep adjustment screw 170 changes the overall or effective axial length of the spring member 190. The change in the effective axial length of the spring member 190 changes the amount of torsional motion effected by a given axial motion of the shaft member 96. The sweep adjustment screw 170 thereby sets the sensitivity of the pointer element 92 or, in other words, the amount of circumferential pointer motion relative to the dial face 84.

Because using the sweep calibration mechanism also affects the zero position of the pointer element 92, the zero calibration member 180 must be readjusted after a sweep adjustment has been made.

PARTS LIST FOR FIGS. 1–8

10 housing
14 hollow interior
18 pneumatic bulb
22 circumferential inner wall
24 conduit
26 bottom wall
27 circumferential ridge
30 open top end
34 bellows assembly
38 inflatable bladder component
40 flexible body
41 direction
42 support plate
44 hinge direction
46 center opening
48 threaded portion
50 port
54 top bearing surface
58 bridge member
62 lateral ends
64 screws
65 recess
70 opening
72 opening
75 top surface
76 opening
77 upper portion
78 lower portion
79 shoulder
80 gage mechanism
83 opening
84 dial face
85 indicating portion
88 window
92 pointer element
94 upper extending portion
96 shaft member
98 lower extending portion 99 vertical direction
100 distal end
104 proximal end
106 spring member
108 attachment holes
110 sleeve
111 bottom end
112 slots
113 ring section
114 spring screw
115 upper portion
116 threaded lower portion
117 engagement portion
118 top cap member (zero adjustment member)
119 flats
120 center opening
121 through opening
122 bottom cap member
123 top section
124 intermediate section
125 bottom shoulder section
126 biasing spring
128 opening
129 shoulder
130 cylindrical pin
134 cylindrical pin
140 housing
142 support member
148 upper support portion
152 lower support portion
154 cross pieces
160 fasteners
164 opening
166 bearing contact surfaces
170 sweep adjustment screw
174 opening
178 threaded portion
180 zero adjustment member
184 opening
186 bearing contact surfaces
188 opening
190 spring member
192 end
194 weld Though the present invention has been described in terms of a pair of specific embodiments, it will be appreciated that modifications and variations are possible using the concepts described herein which are within the intended scope of the invention according to the appended claims.

For example, the zero adjustment member 180 and/or the sweep adjustment screw 170 in the preceding embodiment could be shifted to the upper support portion as opposed to the lower support portion to allow calibration without major disassembly of the measuring device housing 140.

We claim:

1. A movement mechanism comprising:
   a shaft member having opposing first and second ends and an axis defined between said first and second ends;
   axial displacement means for moving said first end of said shaft member in an axial direction; and
   at least one spring member coaxially positioned relative to said shaft member axis, said spring member being attached at one end to an intermediate portion of said shaft member and attached at an opposite end to a support, wherein said displacement means causes said shaft member to translate in said axial direction, said spring member to flex, and said shaft member to rotate.

2. A movement mechanism according to claim 1, including displacement adjustment means for adjusting the amount of rotation of said shaft member for a given axial translation thereof.

3. A movement mechanism according to claim 2, wherein said spring member has an initial predetermined axial length when attached at each end to said shaft member and said support, said displacement adjustment means being capable of varying said predetermined axial length so as to vary the amount of rotation of said shaft member for a given axial displacement.

4. A movement mechanism according to claim 3, wherein said displacement adjustment means includes means for axially displacing one of said support and said shaft member so as to vary the initial predetermined axial length of said spring member.

5. A movement mechanism according to claim 4, wherein said displacement adjusting means is coaxially disposed relative to the axis of said shaft member.

6. A movement mechanism according to claim 1, wherein said first end of said shaft member is disposed adjacent to said displacement means, said shaft member being supported to allow axial movement upon movement by said displacement means.

7. A movement mechanism according to claim 1, including indicating means for indicating the amount of rotation of said shaft member.

8. A movement mechanism according to claim 7, wherein said indicating means includes a pointer attached to said second end of said shaft member, said pointer being capable of circumferential movement during rotation of said shaft member.

9. A movement mechanism according to claim 8, including rotational position adjustment means for selectively adjusting the rotational position of said shaft member to a predetermined position.

10. A movement mechanism according to claim 9, wherein said indicating means further includes a dial face having indicating indicia, said rotational position adjustment means allowing the circumferential position of said pointer to be adjusted to a reference position located on said dial face.

11. A movement mechanism according to claim 1, including means for attaching the ends of said at least one spring member to said support and said shaft member, said means allowing hinging of said spring member during axial translation and rotation of said shaft member.

12. A movement mechanism according to claim 11, wherein said at least one spring member includes attachment holes at each end thereof, said holes having diameters which are oversized relative to engagement members extending from said shaft member and said support.

13. A movement mechanism according to claim 12, wherein said engagement members are cylindrical pins extending from each of said shaft member and said support.

14. A movement mechanism according to claim 1, wherein said spring member is a thin ribbon helically wound about a portion of said shaft member.

15. A movement mechanism according to claim 9, wherein said rotational position adjustment means and said displacement adjustment means are coaxial with said shaft member axis.

16. A movement mechanism according to claim 9, wherein said rotational position adjustment means includes at least one adjustment member having an opening sized for engaging said shaft member, said at least one adjustment member being rotatable for simultaneously rotating said shaft member and said support.

17. A movement mechanism as recited in claim 14, wherein said spring member is fabricated from beryllium copper.

18. A mechanism for use in a measurement device, said device comprising a housing, displacement means disposed within said housing, and indicating means responsive to said displacement means for indicating a change in a parametric value based on movement of said displacement means, said movement mechanism including:

a shaft member disposed in said housing between said indicating means and said displacement means, said shaft member having opposing first and second ends defining an axis therebetween; and at least one spring member coaxially positioned relative to said shaft member axis, said spring member having a first end attached to said shaft member and a second end attached to a support, wherein said displacement means causes said shaft member to translate along said shaft axis, said spring member to flex, and said shaft member to rotate.

19. A mechanism according to claim 18, including displacement adjustment means for adjusting the amount of rotation of said shaft member for a given axial translation thereof.

20. A mechanism according to claim 19, wherein said spring member has an initial predetermined axial length when attached at each end to said shaft member and said support, said displacement adjustment means being capable of varying said predetermined axial length so as to vary the amount of rotation of said shaft member for a given axial displacement.

21. A mechanism according to claim 20, wherein said displacement adjustment means includes means for axially displacing one of said support and said shaft member so as to vary the initial predetermined axial length of said spring member.

22. A mechanism according to claim 21, wherein said displacement adjusting means is coaxially disposed relative to the axis between said shaft member ends.

23. A mechanism according to claim 18, wherein said first end of said shaft member is disposed adjacent to said displacement means, said shaft member being supported to allow axial movement upon axial movement by said displacement means.

24. A mechanism according to claim 18, including indicating means for indicating the amount of rotation of said shaft member.

25. A mechanism according to claim 24, wherein said indicating means includes a pointer attached to said second end of said shaft member, said pointer being capable of circumferential movement during rotation of said shaft member.

26. A mechanism according to claim 25, including rotational position adjustment means for selectively adjusting the rotational position of said shaft member to a predetermined position.

27. A mechanism according to claim 26, wherein said indicating means further includes a dial face having indicating indicia, said rotational position adjustment means allowing the circumferential position of said pointer to be adjusted to a reference position relative to said dial face.

28. A mechanism according to claim 18, including means for attaching the ends of said at least one spring member to said support and said shaft member, said means allowing hinging of an attached spring member end during axial translation and rotation of said shaft member.

29. A mechanism according to claim 28, wherein said at least one spring member includes attachment holes at each end thereof, said holes having diameters which are oversized relative to engagement members extending from said shaft member and said support.

30. A mechanism according to claim 29, wherein said engagement members are cylindrical pins extending from each of said shaft member and said support.

31. A mechanism according to claim 18, wherein said spring member is a thin ribbon helically wound about said shaft member.

32. A mechanism according to claim 26, wherein said rotational position adjustment means and said displacement adjustment means are coaxially located along axis between said shaft member ends.

33. A mechanism according to claim 26, wherein said rotational position adjustment means includes at least one adjustment member having an opening sized for engaging said shaft member, said at least one adjustment member being rotatable for simultaneously rotating said shaft member and said support.

34. A mechanism as recited in claim 31, wherein said spring member is fabricated from a thin section of beryllium copper.

35. A mechanism as recited in claim 32, wherein said shaft is retained in a support having an opening for allowing axial translation therethrough.

36. A mechanism as recited in claim 35, wherein said displacement adjustment means includes an adjustment member attached to said support through said opening, said member having an opening for receiving said shaft.

37. A mechanism according to claim 36, wherein said opening and said adjustment member include corresponding threads for allowing said adjustment member to rotate to cause a change in the predetermined axial distance between the ends of said spring member.

* * * * *